(12) United States Patent
Silny et al.

(10) Patent No.: US 9,030,660 B2
(45) Date of Patent: May 12, 2015

(54) MULTI-BAND IMAGING SPECTROMETER

(71) Applicant: Raytheon Company, Waltham, MA (US)

(72) Inventors: John F. Silny, Playa Vista, CA (US); Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 130 days.

(21) Appl. No.: 13/622,564

(22) Filed: Sep. 19, 2012

(65) Prior Publication Data

US 2014/0078492 A1 Mar. 20, 2014

(51) Int. Cl.
*G01J 3/28* (2006.01)
*G01J 3/18* (2006.01)
*G01J 3/36* (2006.01)

(52) U.S. Cl.
CPC .............. *G01J 3/18* (2013.01); *G01J 3/2823* (2013.01); *G01J 3/36* (2013.01)

(58) Field of Classification Search
USPC ................................................ 356/300–334
See application file for complete search history.

(56) References Cited

U.S. PATENT DOCUMENTS

| | | |
|---|---|---|
| 5,276,321 A | 1/1994 | Chang et al. |
| 7,038,191 B2 | 5/2006 | Kare et al. |
| 7,199,876 B2 | 4/2007 | Mitchell |
| 7,382,498 B1 | 6/2008 | Cook |
| 7,386,226 B2 | 6/2008 | Miyoshi et al. |
| 7,518,722 B2 | 4/2009 | Julian et al. |
| 7,554,572 B2 | 6/2009 | Takahashi |
| 7,884,931 B2 | 2/2011 | Achal et al. |
| 2006/0244957 A1* | 11/2006 | Furman et al. ............. 356/237.4 |

* cited by examiner

*Primary Examiner* — Abdullahi Nur
(74) *Attorney, Agent, or Firm* — Burns & Levinson LLP; Joseph M. Maraia

(57) ABSTRACT

One embodiment disclosed is a spectrometry system for collecting spatially and temporally co-registered hyperspectral data covering multiple spectral bands. The spectrometry system includes a single entrance slit for receiving light and a plurality of disperser elements operating over a plurality of distinct spectral bands to disperse the received light into constituent spectral channels. The system also includes a plurality of collimating and imaging optic elements that receive and re-image the dispersed light. The system also includes at least two focal plane arrays affixed in a common plane and configured to receive the re-imaged dispersed light, each of the at least two focal plane arrays being dedicated to sensing a distinct spectral band of the dispersed light.

22 Claims, 3 Drawing Sheets

MULTI-BAND IMAGING SPECTROMETER

BACKGROUND

Multi-band imaging spectrometers are used to form images in a wide range of spectral bands. The spectrometers provide images and spectral data of the images in particular wavelength bands.

SUMMARY

Prior art in the field of integrated multi-band spectrometers is typified by U.S. Pat. No. 7,382,498, which is incorporated by reference in its entirety. The various structural and functional differences and advantages of the present application over this prior art will be seen to be both novel and significant from the following discussion and Figures.

One embodiment is a spectrometry system for collecting spatially and temporally co-registered hyperspectral data covering multiple spectral bands. The spectrometry system includes a single entrance slit for receiving light. The spectrometry system also includes a plurality of disperser elements operating over a plurality of distinct spectral bands to disperse the received light into constituent spectral channels within each band. The spectrometry system also includes a plurality of collimating and imaging optic elements that receive and re-image the dispersed light. The spectrometry system also includes at least two focal plane arrays affixed in a common plane and configured to receive the re-imaged dispersed light, each of the at least two focal plane arrays being dedicated to sensing a distinct spectral band of the dispersed light. The spectrometry system also includes a common clock for synchronizing the integration timing between the at least two focal plane arrays, thereby ensuring that each light-sensing pixel of the at least two focal plane arrays is temporally co-registered.

In some embodiments, the spectrometry system includes a dichroic element positioned adjacent to the one or more disperser elements for splitting the received light into distinct beams according to wavelength. In some embodiments, the plurality of collimating and imaging optics define a double-pass reflective triplet imaging spectrometer. In some embodiments, the single entrance slit defines a curved line. In some embodiments, the single entrance slit defines a straight line.

In some embodiments, the plurality of distinct spectral bands comprise one or more of long wave infrared, visible, near infrared, short-wave infrared, mid-wave infrared, or any combination thereof. In some embodiments, the single entrance slit is located on an optical axis for receiving light. In some embodiments, the single entrance slit is offset from an optical axis for receiving light. In some embodiments, each of the at least two focal plane arrays are equidistantly disposed about the single entrance slit.

Another embodiment is a hyperspectral data collection system that includes at least two focal plane arrays configured to receive dispersed light received from a single entrance slit, each of the at least two focal plane arrays being dedicated to sensing a distinct spectral band of the dispersed light. The hyperspectral data collection system also includes a common clock for synchronizing integration timing between the at least two focal plane arrays, thereby ensuring that each light-sensing pixel of the at least two focal plane arrays is temporally co-registered and contemporaneously framing an output image.

In some embodiments, the single entrance slit is located on an optical axis for receiving light. In some embodiments, the single entrance slit is offset from an optical axis for receiving light. In some embodiments, the single entrance slit defines a straight line. In some embodiments, the single entrance slit defines a curved line.

Another embodiment is a method of contemporaneously collecting hyperspectral data covering multiple spectral bands. The method includes receiving a focused beam of light through a single entrance slit of a spectrometry system. The method also includes collimating the focused beam of light. The method also includes separating the collimated light into its constituent spectral colors (channels). The method also includes imaging the separated light for receipt by an imaging detector. The method also includes receiving the separated light at an imaging detector comprising at least two focal plane arrays, each of the at least two focal plane arrays being dedicated to sensing a distinct spectral band of the dispersed light and being equidistantly disposed about the single entrance slit. The method also includes synchronizing integration timing between the at least two focal plane arrays using a common clock, thereby ensuring that each light-sensing pixel of the at least two focal plane arrays is temporally co-registered.

In some embodiments, the method includes outputting spatially and temporally co-registered hyperspectral data. In some embodiments, the method includes, through use of a dichroic element, splitting the received light into distinct beams according to wavelength. In some embodiments, the plurality of collimating and imaging optics define a double-pass reflective triplet imaging spectrometer. In some embodiments, the single entrance slit defines a straight line. In some embodiments, the single entrance slit defines a curved line. In some embodiments, the single entrance slit is located on an optical axis for receiving light. In some embodiments, the single entrance slit is offset from an optical axis for receiving light.

The hyperspectral data collection methods and systems described herein (hereinafter "technology") can provide one or more of the following advantages. One advantage of the technology is that it spatially co-registers hyperspectral data acquired by two or more focal plane arrays used to acquire the hyperspectral data by using a single entrance slit for receiving light from an object or scene to be imaged. The technology also temporally co-registers the hyperspectral data acquired by two or more focal plane arrays used to acquire the hyperspectral data by using a common clock for synchronizing the focal plane arrays. The technology also reduces optical distortion at the focal image plane by using a single entrance slit for receiving light from an object or scene to be imaged. The technology also reduces the system size required to collect the hyperspectral data. The technology provides the full available spectrum in the image to each pixel without registration or re-sampling errors because the hyperspectral data is inherently spatially and temporally co-registered. The technology provides operators (e.g., scientists) with more accurate spectral data because data for images for different spectral bands can be acquired that are spatially and temporally co-registered. For example, because the data is spatially and temporally co-registered, an operator is able to look at the same location at the same point in time and view a full spectrum without any resampling errors. The technology also enables novel signal processing that can advantageously use the spatially and temporally multi-band spectrum.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings.

DETAILED DESCRIPTION OF ILLUSTRATIVE EMBODIMENTS

Figure 1:
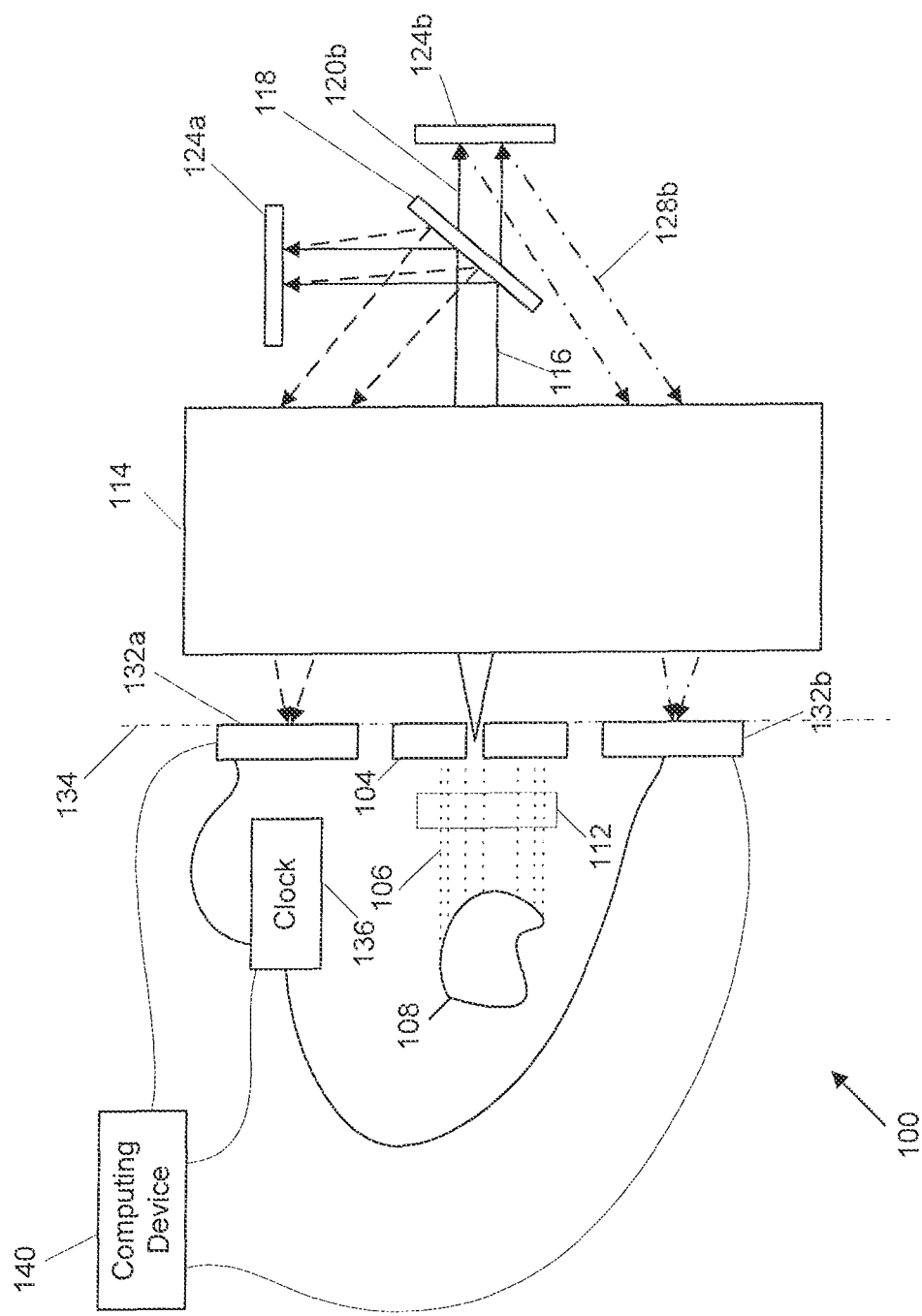
FIG. 1 is a schematic illustration of a system for collecting hyperspectral data, according to an illustrative embodiment.

FIG. 1 is a schematic illustration of a system 100 for collecting hyperspectral data, according to an illustrative embodiment. The system 100 includes a variety of optical elements to process light received from an object or scene. In this embodiment, the system 100 includes a single entrance slit 104 for receiving light 106 from an object 108. Use of a single slit, rather than multiple slits, provides for spatial co-registration of pixels of the light 106 when the light 106 is subsequently dispersed and imaged onto focal plane arrays. It must be appreciated that the use of multiple slits provides the optical designer additional degrees of freedom not available when using a single slit. In this sense, use of a single slit is more constraining on the optical design prescription. In some embodiments, the slit defines a straight line coinciding with the optical axis of the system 100. In other embodiments, the slit may be curved and/or offset relative to the optical axis of the system 100. The dimensions of the slit are selected based on the properties of the incoming light and the spectral properties the system is intended to image. Increasing the slit width has the advantage of better sensitivity (by collecting more light), but reduces spatial resolution (in the transverse slit direction) and spectral resolution (at a fixed dispersion). Decreasing the slit width has the advantages of providing better spatial resolution (in the transverse slit direction) and spectral resolution (at a fixed dispersion), but reduces sensitivity (by collecting less light). The light 106 is focused through the slit 104 with imaging optics 112 (e.g., an objective lens).

The imaging optics 112 gathers the light 106 from the object being observed and focuses the light rays to produce an image. The focused light passes through the slit 104 where it is passed to a set of spectrometer optics that perform the typical optical functions of collimating, dispersing, and imaging. The spectrometer optics can either be single pass or double pass. The preferred embodiment is a double-pass reflective triplet imaging spectrometer (RTIS) optical form, in which optics 114 provide the functions of both collimating and imaging. The first pass through optics 114 produces collimated light 116. The collimating optics can be composed of reflective elements (e.g. mirrors), refractive elements (e.g. lens), or a combination of the two (to form a so-called catadioptric system).

The collimated light 116 is provided to a dichroic optical element 118 to split the collimated light 116 into two light bundles 120a and 120b. These two light bundles 120a and 120b represent distinct spectral bands (e.g. midwave infrared (MWIR) light for band 1, and longwave infrared (MWIR) light for band 2; or visible, near infrared, and shortwave infrared (VNIR/SWIR) light for band 1, and longwave infrared (LWIR) light for band 2). The two light bundles 120a and 120b are then directed to optical disperser elements 124a and 124b, respectively. The disperser elements 124a and 124b disperse the light bundles into dispersed light bundles 128a and 128b, respectively, having particular spectral separation that are specified by the properties of the disperser elements. In some embodiments, the system 100 is configured for spectral bands that include one or more of long wave infrared energy, visible energy, near infrared energy, short-wave infrared energy, mid-wave infrared energy, or combinations of these. In some embodiments, one or more optical disperser elements are included so multiple spectral bands can be imaged.

In some embodiments, the disperser elements 124a and 124b are diffraction gratings. A diffraction grating is an optical component with a periodic structure. The periodic structure interacts with incident light and diffracts the light into several beams travelling in different angular directions. The directions that the beams travel depend on the spacing of the grating and the wavelength of the light so that the grating acts as the dispersive element.

In some embodiments, the disperser elements 124a and 124b are prisms. A prism is a transparent optical element that refracts light. The refractive index of many materials used to fabricate prisms varies as a function of the color or wavelength of the light introduced to the prism. As a result, light provided to the prism is refracted and dispersed into several beams.

In some embodiments, the disperser elements 124a and 124b are grisms. A grism is a combination of a grating and prism. A grism is a prism with a grating structure manufactured into one or more of its surfaces of the prism. Properties of the prism and grating are selected so a chosen to obtain a desired total dispersion of the grism.

In some embodiments, one of the dispersive elements can be a prism and the other dispersive element can be a grating.

The dispersed light bundles 128a and 128b are then directed to the collimating and imaging optics 114 that receive the dispersed light. The collimating and imaging optics 114 re-image the dispersed light signals 128a and 128b on to focal plane array 132a and 132b, respectively. The focal plane arrays can be, for example, equidistantly disposed about the single entrance slit 104 along plane 134. In some embodiments, the collimating and imaging optics 114 define a double-pass reflective triplet imaging spectrometer (RTIS) that includes a plurality of reflective optical elements. Each focal plane array senses a distinct spectral band of the dispersed light. Focal plane array 132a receives light dispersed by disperser element 124a. Focal plane array 132b receives light dispersed by disperser element 124b. The focal plane arrays 132a and 132b are affixed in a common plane 134 to receive the re-imaged dispersed light, although the focal plane arrays may be intentionally offset for optimal optical alignment. A focal plane array is an image sensing device that includes an array of light-sensing pixels that are located at the focal plane of an optical system (in this case, a multi-band imaging spectrometer). In some embodiments, three spectral bands are generated and measured by three corresponding focal plane arrays.

Different focal plane arrays can be used in some embodiments where each array is configured for a particular spectral range. For example, in one embodiment, 256×256 pixel arrays are used in which each pixel is a 40 μm×40 μm pixel. The spectral range of the first array is 0.4 to 2.5 μm (the VNIR/SWIR spectral band) and the spectral range of the second array is 7.5-12.5 μm (the LWIR spectral band).

A clock module 136 is coupled to both of the focal plane arrays 132a and 132b. The computing device 140 sends a signal to the clock 136 that sends a clock signal to the focal plane arrays 132a and 132b. The clock signal synchronizes the image integration timing of the focal plane arrays 132a and 132b causing the pixels of the images acquired by the focal plane arrays 132a and 132b to be co-registered in time. The computing device 140 is coupled to the focal plane arrays 132a and 132b. The focal plane arrays 132a and 132b output the data acquired (e.g., hyperspectral data) to the computing device 140. The hyperspectral data may then be further processed or stored.

Figure 2:
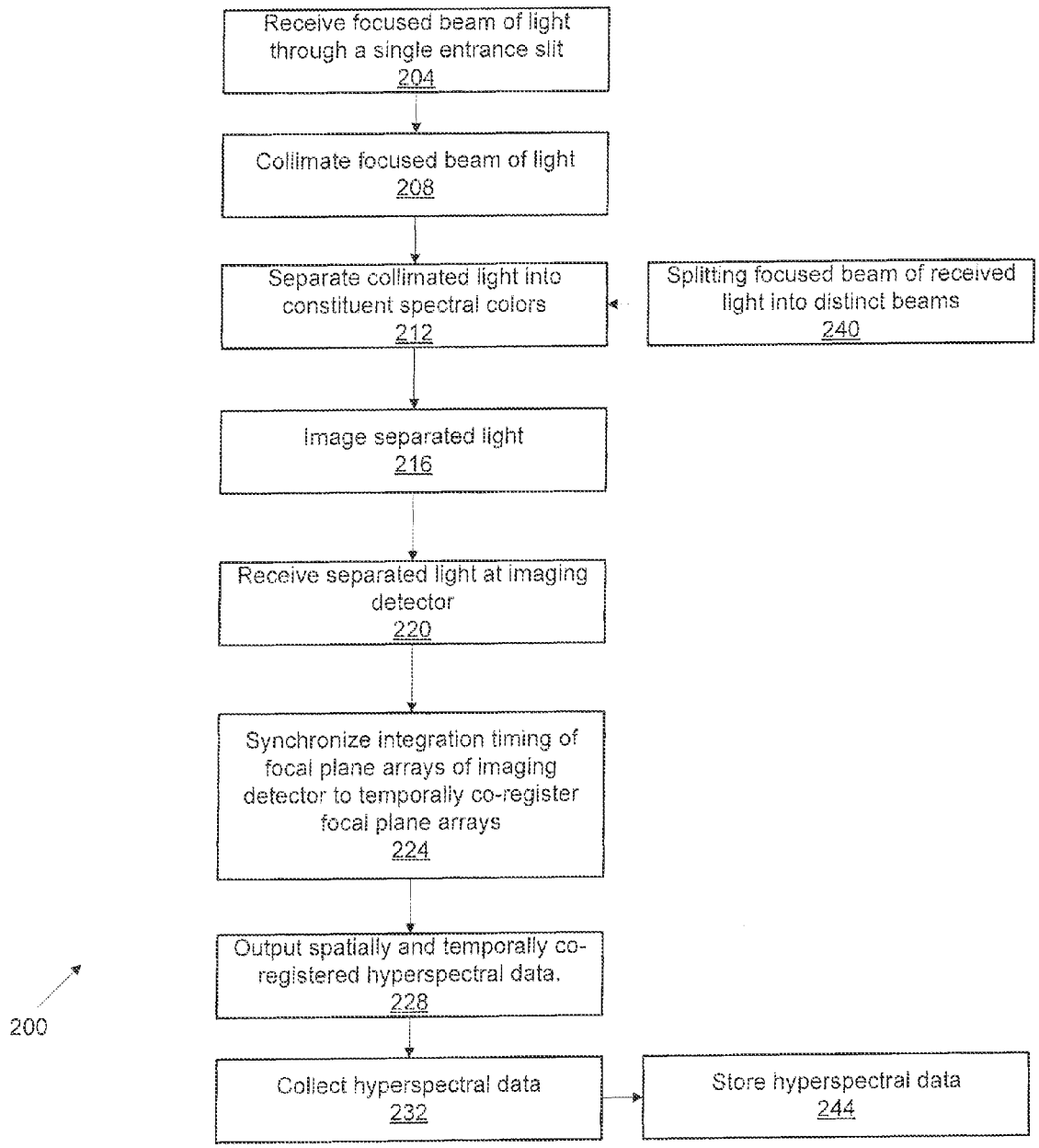
FIG. 2 is a flowchart of a method for collecting hyperspectral data, according to an illustrative embodiment.

FIG. 2 is a flowchart 200 of a method for collecting hyperspectral data using, for example, the system 100 of FIG. 1. The method includes receiving 204 a focused beam of light through a single entrance slit (e.g., slit 104 of FIG. 1). The beam of light can be light emitted by an object that is focused by an objective lens located in front of the entrance slit. The method then includes collimating 208 the focused beam of light.

The method also includes separating 212 the collimated light into constituent spectral colors bands. In some embodiments, separating 212 the collimated light involves splitting the focused beam of received light into distinct beams. The beams can be particular spectral bands of energy that are specified by the properties of the optical components (e.g., diffraction gratings, prisms, or grisms) that will subsequently disperse the light signals. In some embodiments, the system is configured to separate the light signals into bands of long wave infrared energy, visible energy, near infrared energy, short-wave infrared energy, mid-wave infrared energy, or combinations of these.

The method also includes imaging 216 the separated light for receipt by one or more focal plane arrays using, for example, the imaging and collimating optics 114 of FIG. 1. The system 100 is often referred to as an imaging spectrometer as opposed to simply a spectrometer because they have multiple spatial pixels that create an image. Older spectrometers would provide a user with a spectrum, but for only a single spatial pixel (i.e. one point of the scene). The technology disclosed here supports designs that not only collect a spectrum, but do so for many pixels in an image simultaneously. This has the advantage of allowing one to collect more area faster. The light is then received 220 at two or more focal plane arrays (e.g., focal plane arrays 132a and 132b of FIG. 1). In some embodiments, the focal plane arrays are each configured to sense a distinct spectral band of the dispersed light.

The method also includes synchronizing 224 the integration timing of the focal plane arrays so each light-sensing pixel of the focal plane arrays is temporally co-registered. Because the original incoming light is split between two channels of the system, the images acquired by the light-sensing pixels are also spatially co-registered. The hyperspectral data acquired by the focal plane arrays is the output 228 to a computing device (e.g., computing device 140 of FIG. 1) that collects 232 for subsequent processing or storage 244.

Figure 3:
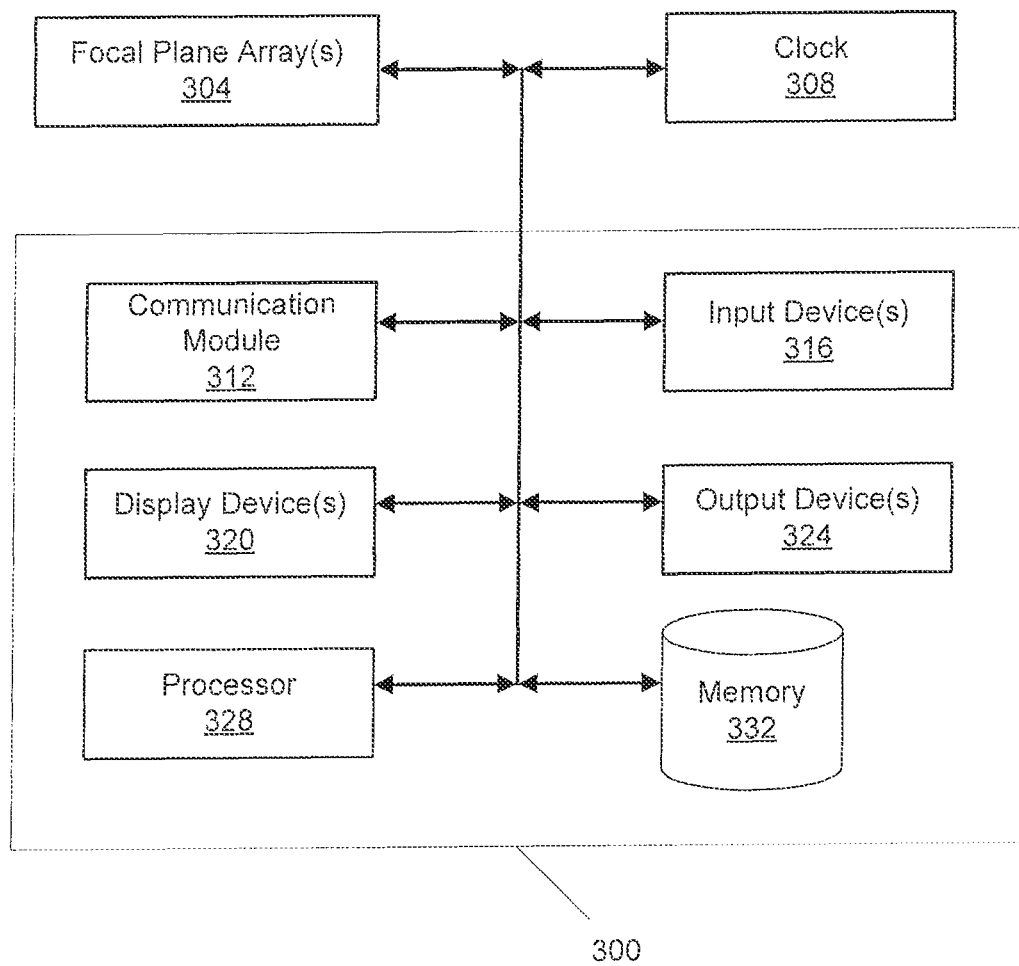
FIG. 3 is a block diagram of a computing device used with a system for collecting hyperspectral data, according to an illustrative embodiment.

FIG. 3 is a schematic illustration of a computing device 300 for operating a spectrometry system (e.g., the system 100 of FIG. 1). The computing device 300 data and/or data to and from the focal plane arrays 304 and clock 308 (e.g., focal plane arrays 132a and 132b, and clock 136 of FIG. 1). The computing device 300 includes one or more input devices 316, one or more output devices 324, one or more display devices(s) 320, one or more processor(s) 328, memory 332, and a communication module 312. The modules and devices described herein can, for example, utilize the processor 328 to execute computer executable instructions and/or the modules and devices described herein can, for example, include their own processor to execute computer executable instructions. It should be understood the computing device 300 can include, for example, other modules, devices, and/or processors known in the art and/or varieties of the described modules, devices, and/or processors.

The communication module 312 includes circuitry and code corresponding to computer instructions that enable the computing device to send/receive signals to/from the focal plane array(s) 304 and clock 308. For example, the communication module 312 provides commands from the processor 328 to the clock 308 to synchronize the integration timing of the focal plane arrays 304. The communication module 312 also, for example, receives hyperspectral data corresponding to the re-imaged dispersed light which can be stored by the memory 332 or otherwise processed by the processor 328.

The input devices 316 receive information from a user (not shown) and/or another computing system (not shown). The input devices 316 can include, for example, a keyboard, a scanner, a microphone, a stylus, a touch sensitive pad or display. The output devices 324 output information associated with the computing device 300 (e.g., information to a printer, information to a speaker, information to a display, for example, graphical representations of information). The processor 328 executes the operating system and/or any other computer executable instructions for the computing device 300 (e.g., executes applications). The memory 332 stores a variety of information/data, including profiles used by the computing device 300 to specify how the spectrometry system should process light coming into the system for imaging. The memory 332 can include, for example, long-term storage, such as a hard drive, a tape storage device, or flash memory; short-term storage, such as a random access memory, or a graphics memory; and/or any other type of computer readable storage.

The above-described systems and methods can be implemented in digital electronic circuitry, in computer hardware, firmware, and/or software. The implementation can be as a computer program product that is tangibly embodied in an information carrier. The implementation can, for example, be in a non-transitory machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors, or one or more servers that include one or more processors, that execute a computer program to perform functions of the disclosure by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data. Magnetic, magneto-optical disks, or optical disks are examples of such storage devices.

Data transmission and instructions can occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A spectrometry system for collecting spatially and temporally co-registered hyperspectral data covering multiple spectral bands, the spectrometry system comprising:
   a) a single entrance slit for receiving light;
   b) a plurality of disperser elements operating over a plurality of distinct spectral bands to disperse the received light into constituent spectral channels;
   c) a plurality of collimating and imaging optic elements that receive and re-image the dispersed light;
   d) at least two focal plane arrays affixed in a common plane and configured to receive the re-imaged dispersed light, each of the at least two focal plane arrays being dedicated to sensing a distinct spectral band of the dispersed light; and
   e) a common clock for synchronizing the integration timing between the at least two focal plane arrays, thereby ensuring that each light-sensing pixel of the at least two focal plane arrays is temporally co-registered.

2. The spectrometry system of claim 1, further comprising a dichroic element positioned adjacent the one or more disperser elements for splitting the received light into distinct beams according to wavelength.

3. The spectrometry system of claim 1, wherein the plurality of collimating and imaging optics define a double-pass reflective triplet imaging spectrometer.

4. The spectrometry system of claim 1, wherein the single entrance slit defines a curved line.

5. The spectrometry system of claim 1, wherein the single entrance slit defines a straight line.

6. The spectrometry system of claim 1, wherein the plurality of distinct spectral bands comprise one or more of long wave infrared, visible, near infrared, short-wave infrared, mid-wave infrared, or any combination thereof.

7. The spectrometry system of claim 1, wherein the single entrance slit is located on an optical axis for receiving light.

8. The spectrometry system of claim 1, wherein the single entrance slit is offset from an optical axis for receiving light.

9. The spectrometry system of claim 1, wherein each of the at least two focal plane arrays are equidistantly disposed about the single entrance slit.

10. A hyperspectral data collection system, the system comprising:
   a) a single entrance slit for receiving light;
   b) a plurality of disperser elements for dispersing the received light into constituent spectral channels;
   c) a plurality of collimating and imaging optic elements that receive and re-image the dispersed light;
   d) at least two focal plane arrays configured to receive the re-imaged dispersed light, each of the at least two focal plane arrays being dedicated to sensing a distinct spectral band of the re-imaged dispersed light; and
   e) a common clock for synchronizing integration timing between the at least two focal plane arrays, thereby ensuring that each light-sensing pixel of the at least two focal plane arrays is temporally co-registered and contemporaneously framing an output image.

11. The hyperspectral data collection system of claim 10, wherein the single entrance slit is located on an optical axis for receiving light.

12. The hyperspectral data collection system of claim 10, wherein the single entrance slit is offset from an optical axis for receiving light.

13. The hyperspectral data collection system of claim 10, wherein the single entrance slit defines a straight line.

14. The hyperspectral data collection system of claim 10, wherein the single entrance slit defines a curved line.

15. A method of contemporaneously collecting hyperspectral data covering multiple spectral bands comprising:
   a) receiving a focused beam of light through a single entrance slit of a spectrometry system;
   b) collimating the focused beam of light;
   c) separating the collimated light into its constituent spectral channels;
   d) imaging the separated light for receipt by an imaging detector;
   e) receiving the separated light at an imaging detector comprising at least two focal plane arrays, each of the at least two focal plane arrays being dedicated to sensing a distinct spectral band of the dispersed light and being equidistantly disposed about the single entrance slit; and
   e) synchronizing integration timing between the at least two focal plane arrays using a common clock, thereby ensuring that each light-sensing pixel of the at least two focal plane arrays is temporally co-registered.

16. The method of claim 15, further comprising outputting spatially and temporally co-registered hyperspectral data.

17. The method of claim 15, further comprising, through use of a dichroic element, splitting the received light into distinct beams according to wavelength.

18. The method of claim 15, wherein the plurality of collimating and imaging optics define a double-pass reflective triplet imaging spectrometer.

19. The method of claim 15, wherein the single entrance slit defines a straight line.

20. The method of claim 15, wherein the single entrance slit defines a curved line.

21. The method of claim 15, wherein the single entrance slit is located on an optical axis for receiving light.

22. The method of claim 15, wherein the single entrance slit is offset from an optical axis for receiving light.

* * * * *